US012246468B2

(12) United States Patent
Durfee

(10) Patent No.: US 12,246,468 B2
(45) Date of Patent: Mar. 11, 2025

(54) TRI-PADDLE BORING TOOL

(71) Applicant: APEX BRANDS, INC., Apex, NC (US)

(72) Inventor: Laverne Royal Durfee, Statesville, NC (US)

(73) Assignee: APEX BRANDS, INC., Apex, NC (US)

( * ) Notice: Subject to any disclaimer, the term of this patent is extended or adjusted under 35 U.S.C. 154(b) by 268 days.

(21) Appl. No.: 17/903,297

(22) Filed: Sep. 6, 2022

(65) Prior Publication Data

US 2023/0070755 A1 Mar. 9, 2023

Related U.S. Application Data

(60) Provisional application No. 63/241,684, filed on Sep. 8, 2021.

(51) Int. Cl.
*B27G 15/00* (2006.01)

(52) U.S. Cl.
CPC .................................... *B27G 15/00* (2013.01)

(58) Field of Classification Search
CPC ............. Y10T 408/902; Y10T 408/904; Y10T 408/9042; B27G 15/00; B27G 15/02; B23B 51/00035; B23B 51/0095; B23B 51/0054
See application file for complete search history.

(56) References Cited

U.S. PATENT DOCUMENTS

| | | | | |
|---|---|---|---|---|
| D504,446 | S | 4/2005 | Kobayashi | |
| 9,156,094 | B2 * | 10/2015 | Durfee | B23B 51/02 |
| 10,065,250 | B2 * | 9/2018 | Oguri | B23B 51/10 |
| 11,638,960 | B2 * | 5/2023 | Ren | B23B 51/0095 408/214 |
| 2005/0169720 | A1 | 8/2005 | Kobayashi | |
| 2008/0138165 | A1 | 6/2008 | Durfee | |
| 2009/0208302 | A1 | 8/2009 | Durfee | |

* cited by examiner

*Primary Examiner* — Matthew Katcoff
(74) *Attorney, Agent, or Firm* — Burr & Forman LLP

(57) ABSTRACT

A boring tool may include a coupling portion which may be at an end of the boring tool, a shank operably coupled to the coupling portion, a cutting portion operably coupled to the shank and a feed screw which may be operably coupled to the cutting portion at an opposite end of the boring tool from the coupling portion. The cutting portion may further include a first paddle, a second paddle, and a third paddle. Each paddle may each comprise a paddle body, defined by a leading edge and a lateral edge. The paddle bodies may be disposed equiangular around a perimeter of the cutting portion. The leading edge may extend away from a longitudinal axis of the boring tool in a direction substantially perpendicular to the longitudinal axis. The lateral edge may extend away from the leading edge in a direction substantially perpendicular to the leading edge.

18 Claims, 10 Drawing Sheets

TRI-PADDLE BORING TOOL

TECHNICAL FIELD

Example embodiments generally relate to power equipment and, more particularly, relate to improvements for a boring tool.

BACKGROUND

Boring tools are commonly used in both commercial and private settings to bore holes of various sizes and purposes into lumber or other working media. Typically employed in a construction setting, boring tools are most often driven by a driving device with an electric motor that applies torque to a boring tool to rotate it at relatively high speeds. The tool includes a cutting portion that engages lumber or another medium in order to bore a hole in the medium as the tool is rotated at high speed and pressed into the medium to a desired bore depth.

Given that boring tools may be employed to bore holes in media of various types, the boring tool can include a different shank and/or a different cutting portion for its different applications. In circumstances where the quality of the bore is not as important, and where shallower holes may be desired, spade bits are a popular choice. Spade bits commonly have a cutting portion that is relatively broad and flat that performs a boring operation. On the other hand, auger bits are a good choice to use in circumstances where cleaner bores and/or deeper bores are desired. Auger bits commonly have a helical cutting portion where the entire helix is utilized in a boring operation. Additionally, spade bits are typically cheaper to manufacture and cheaper for consumers to purchase than auger bits. Both spade bits and auger bits are examples of common boring tools that can be used with a driving device to bore holes in a working medium. Furthermore, some boring tools may be a hybrid of auger and spade bits in an attempt to incorporate the benefits of each type.

Occasionally, the working medium that a boring tool is used in may contain obstructions (e.g. nails or screws embedded in wood or drywall). Encountering such obstructions while operating a boring tool may have negative effects, such as a nail getting wrapped around the boring tool due to the rotational motion of the boring tool. Thus, creating a boring tool that is better equipped to overcome potential obstructions encountered during use may allow for a more favorable overall experience, as well as improve the longevity of the boring tool.

BRIEF SUMMARY OF SOME EXAMPLES

Some example embodiments may provide for a boring tool. The boring tool may include a coupling portion which may be at an end of the boring tool, a shank which may be operably coupled to the coupling portion, a cutting portion which may be operably coupled to the shank and a feed screw which may be operably coupled to the cutting portion at an opposite end of the boring tool from the coupling portion. The cutting portion may further include a first paddle, a second paddle, and a third paddle. The first paddle, the second paddle, and the third paddle may be disposed equiangular around a perimeter of the cutting portion. The first paddle, the second paddle, and the third paddle may each comprise a paddle body defined by a leading edge and a lateral edge. The leading edge may extend away from a longitudinal axis of the boring tool in a direction substantially perpendicular to the longitudinal axis of the boring tool. The lateral edge may extend away from the leading edge in a direction substantially perpendicular to the leading edge of the paddle body.

Another example embodiment may provide for a boring tool. The boring tool may include a coupling portion which may be at an end of the boring tool, a shank which may be operably coupled to the coupling portion, a cutting portion which may be operably coupled to the shank and a feed screw which may be operably coupled to the cutting portion at an opposite end of the boring tool from the coupling portion. The cutting portion may further include multiple paddles and multiple ribs disposed around a perimeter of the cutting portion. The multiple paddles may each comprise a paddle body, defined by a leading edge and a lateral edge. The leading edge may extend away from a longitudinal axis of the boring tool in a direction substantially perpendicular to the longitudinal axis of the boring tool. The lateral edge may extend away from the leading edge in a direction substantially perpendicular to the leading edge of the paddle body.

A further example embodiment may provide for a boring tool. The boring tool may include a coupling portion which may be at an end of the boring tool, a shank which may be operably coupled to the coupling portion, a cutting portion which may be operably coupled to the shank and a feed screw which may be operably coupled to the cutting portion at an opposite end of the boring tool from the coupling portion. The feed screw may be shaped like a partial prolate spheroid and may be disposed at a distal end of the cutting portion. The feed screw may comprise a base portion which may be operably coupled to the cutting portion, an intermediate portion which may be operably coupled to the base portion, and a tip portion which may be operably coupled to the intermediate portion. The diameter of the feed screw in the tip portion and the intermediate portion may get larger moving toward the base portion. The diameter of the feed screw in the base portion may not get larger moving toward the cutting portion.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1A:
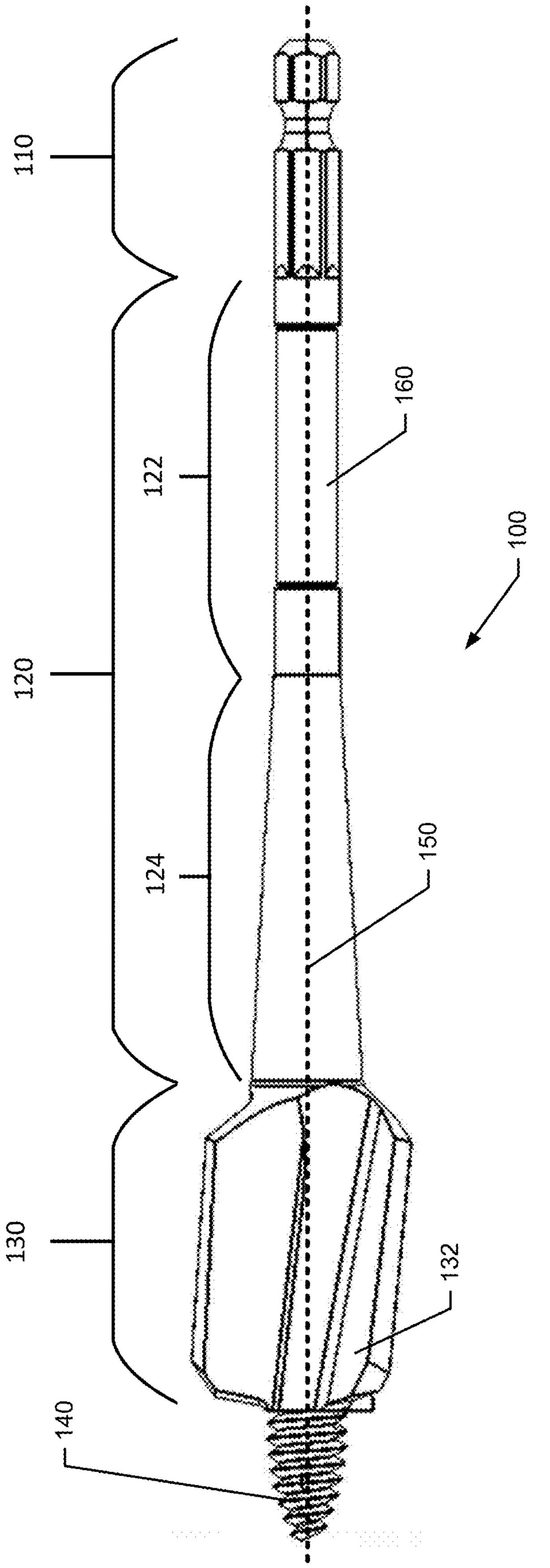
FIG. 1A illustrates a side view of a boring tool in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide a boring tool constructed from a metallic material and having a coupling portion, a shank, a cutting portion, and a feed screw. The cutting portion may comprise multiple paddles which may be designed to remove material from the working medium when the boring tool is being operated. In some embodiments, the paddles may be angled with respect to the longitudinal axis of the boring tool to enhance the boring tool's ability to guide waste material out of the bore, in the opposite direction of the cut, as the boring tool rotates. The boring tool may further comprise ribs disposed in between consecutive paddles that, when the tool is being operated, are designed to push nails and other obstructions embedded in the working medium out of the way of the boring tool. The ribs may extend further forward in the direction of the cut than the paddles in order to protect the tool from obstructions. The boring tool may further comprise a feed screw designed to securely guide the boring tool into the working medium as the boring tool rotates. The shank may have a torsion release neck which may be designed to concentrate torsional load forces. Concentrating torsional load forces and shear stresses away from the cutting portion of the boring tool allows for the boring tool to have improved boring performance and overall improved durability. Other improvements may also be possible, and the improvements can be made completely independent of each other, or in combination with each other in any desirable configuration. Accordingly, the operability and utility of the boring tool may be enhanced or otherwise facilitated while strengthening the boring tool.

FIGS. 1A, 1B, 1C and 1D each illustrate a side view of a boring tool 100 in accordance with various example embodiments. As shown in the figures, the boring tool 100 may include a coupling portion 110, a shank 120, a cutting portion 130, and a feed screw 140. The coupling portion 110 may be configured to operably couple the boring tool 100 to an external device that may provide torque to the boring tool 100. In this regard, the coupling portion 110 may be a part of the boring tool 100 that receives a torque force. In some embodiments, the device may be a handheld power tool such as a drill or an impact driver. In some embodiments, the coupling portion 110 of the boring tool 100 may be configured to have a non-circular outer surface to facilitate translating torque from the device to the boring tool 100. For example, the coupling portion 110 may have a hexagonally shaped cross section to facilitate engagement with a driving device such as a drill. However, in some cases, the coupling portion 110 may have a circular outer surface, and thus a circular cross section.

The shank 120 may operably couple the coupling portion 110 to the cutting portion 130. Thus, the shank 120, may assist with translating torque from the driving device into rotational motion of the cutting portion 130. The coupling portion 110 may be operably coupled to a first portion 122 of the shank 120 and the cutting portion 130 may be operably coupled to a second portion 124 of the shank 120. Therefore, the shank 120 may be subject to high torsional loading due to the shank 120 forming a connection between the coupling portion 110 and the cutting portion 130, both of which may experience opposing forces while the boring tool 100 is in use. In this regard, the driving device may exert a torque on the coupling portion 110 and the working medium may exert a frictional force against the cutting portion 130 that may oppose the direction of rotation of the boring tool 100. Thus, these opposing forces may be naturally distributed throughout the boring tool 100. The cutting portion 130 may be the part of the boring tool 100 that is configured to cut the bore in the working medium. The cutting portion 130 may include a plurality of paddles 132 which will be discussed in greater detail below in reference to later figures. Further, the boring tool 100 may comprise a longitudinal axis 150 that may extend through the center of, and down an entire length of, the boring tool 100, around which the boring tool 100 may rotate when in use.

Figure 1B:
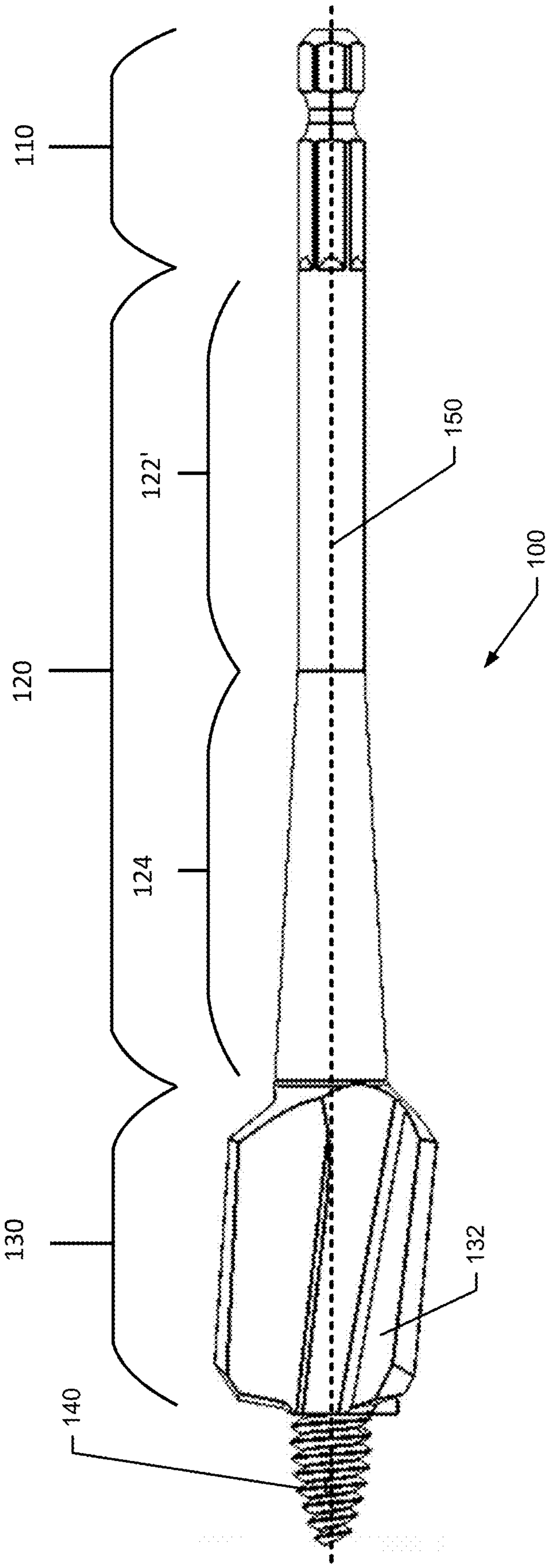
FIG. 1B illustrates a side view of a boring tool in accordance with an example embodiment.
Figure 1C:
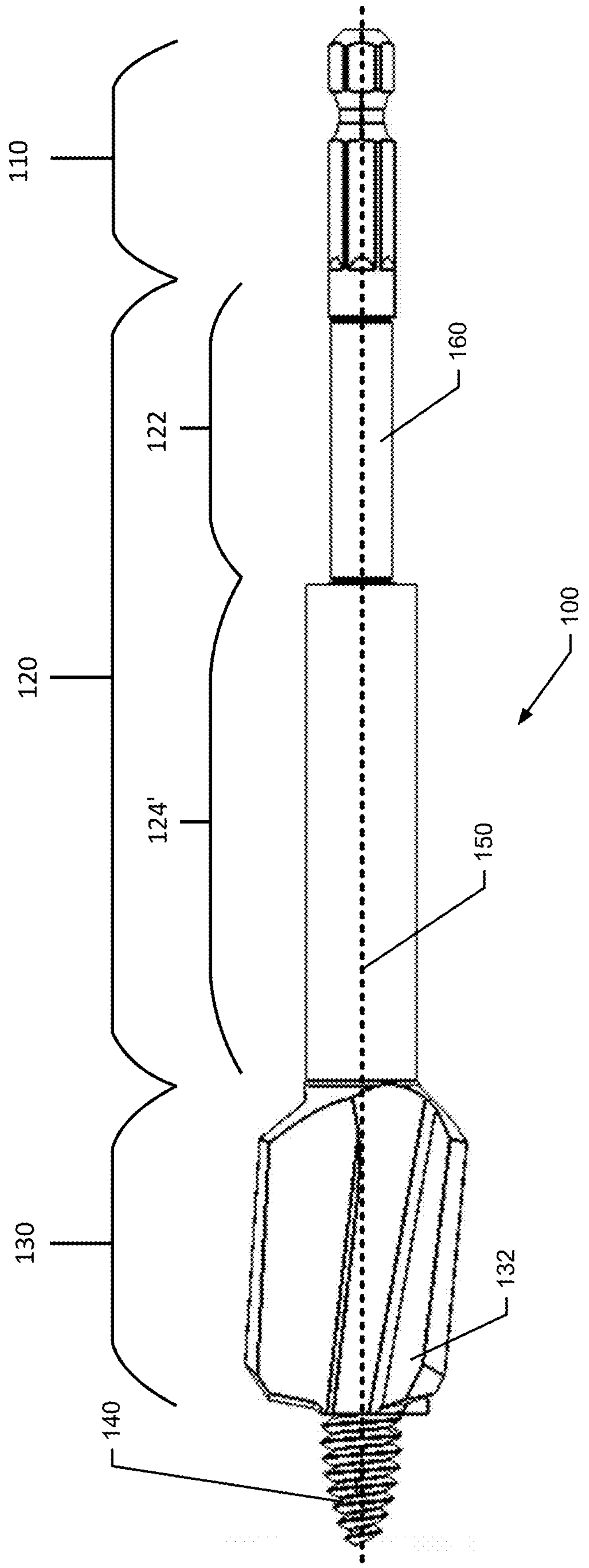
FIG. 1C illustrates a side view of a boring tool in accordance with an example embodiment.

FIGS. 1A and 1C each illustrate a boring tool 100 in an embodiment wherein the shank 120 may further include a torsion release neck 160. The torsion release neck 160 may be a neck in the shank 120 which may have a smaller diameter than both the first portion 122 of the shank 120 and the second portion 124 of the shank 120. In the embodiment of FIG. 1A, the second portion 124 of the shank 120 may be tapered as opposed to having a constant diameter along its length. In this regard, the diameter of the second portion 124 where it meets the cutting portion 130 may be the greatest. The diameter of the second portion 124 where it meets the first portion 122 may be the smallest. In the embodiment of FIG. 1C, the second portion 124' may have a constant diameter along its length. Since boring tools are often made from a single metallic bar stock, machining the torsion release neck 160 to have a smaller diameter than the first portion 122 of the shank 120 and the second portion 124 of the shank 120 may require less time and machining than reducing the diameter of the entire shank 120. Thus, the boring tool 100 may be cheaper to produce and therefore it may be cheaper for a consumer to purchase as well. Further, allowing other portions of the shank 120 to have a larger diameter than the torsion release neck 160 may ensure that the boring tool 100 exhibits adequate levels of rigidity while in use. In this regard, the boring tool 100 may cut straighter bores and may be less likely to warp or change shape over longer periods of time.

Additionally, as a result of the torsion release neck 160 having a smaller diameter than the first portion 122 of the shank 120 and the second portion 124 of the shank 120, the torsion release neck 160 may also have a lower mathematical value for its polar moment of inertia than other portions of the boring tool 100. In this regard, the torsion release neck 160 may be the part of the boring tool 100 that is least resistant to torsional loading. As such, the torsion release neck 160 may help preserve the functionality of both the cutting portion 130 and the coupling portion 110 of the boring tool 100 by reducing the amount of torsional shock felt at these respective portions. Furthermore, due to the inverse mathematical relationship between polar moment of inertia and shear stress, the torsion release neck 160 of the shank 120 may reduce the magnitude of the shear stresses that the boring tool 100 experiences at the cutting portion 130 and the coupling portion 110. In this regard, the torsion release neck 160 may assist with reducing the likelihood of the boring tool 100 experiencing material failures (i.e. cracking or chipping) at either the coupling portion 110 or the cutting portion 130. Thus, the boring tool 100 as a whole may exhibit improved durability and better boring performance as a result of the torsion release neck 160 reducing torsional loading and shear stresses at the cutting portion 130 and the coupling portion 110.

Figure 1D:
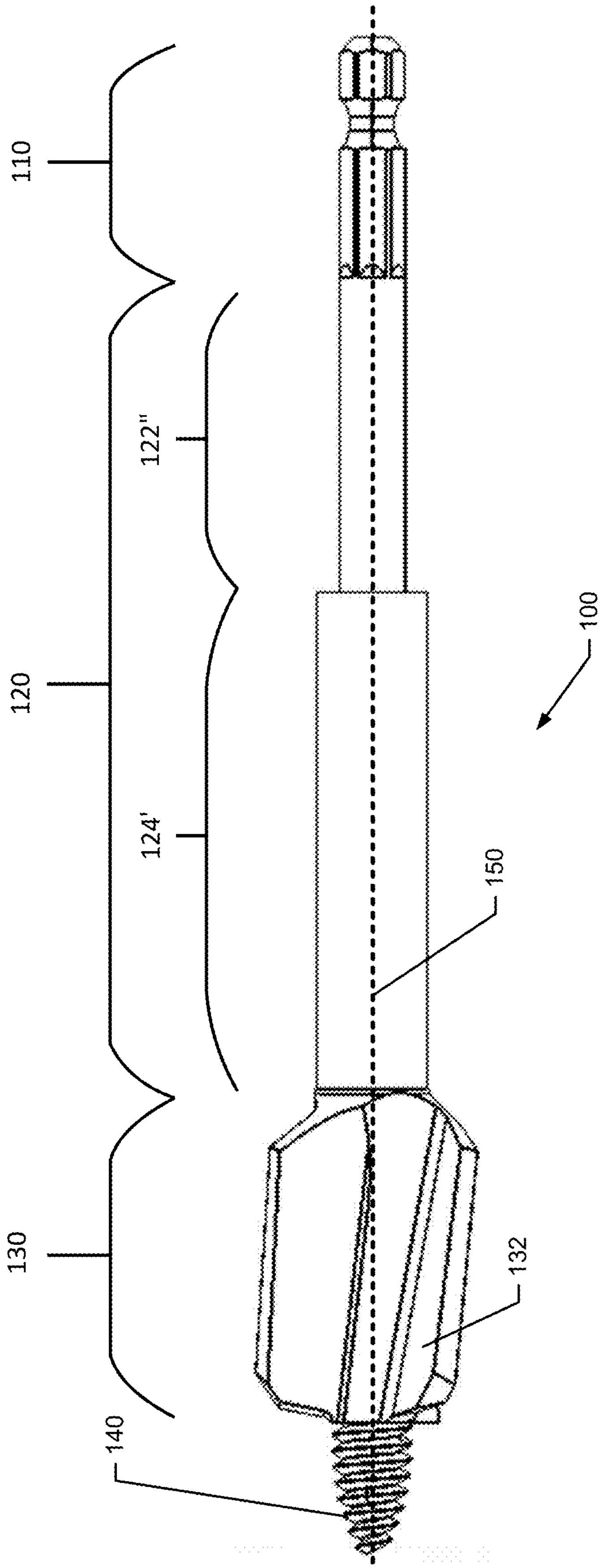
FIG. 1D illustrates a side view of a boring tool in accordance with an example embodiment.

In some embodiments, the boring tool 100 may not have a torsion release neck 160. In this regard, FIGS. 1B and 1D each illustrate a boring tool 100 in an embodiment wherein the shank 120 may not include a torsion release neck 160. In the embodiment of FIG. 1B, the second portion 124 of the shank 120 may be tapered as opposed to having a constant diameter along its length. Thus, the diameter of the second portion 124 where it meets the cutting portion 130 may be the greatest diameter of the entire second portion 124 of the shank 120, and the diameter of the second portion 124 where it meets the first portion 122' may be the smallest. In the embodiment of FIG. 1D, the second portion 124' may have a constant diameter along its length.

Figure 2:
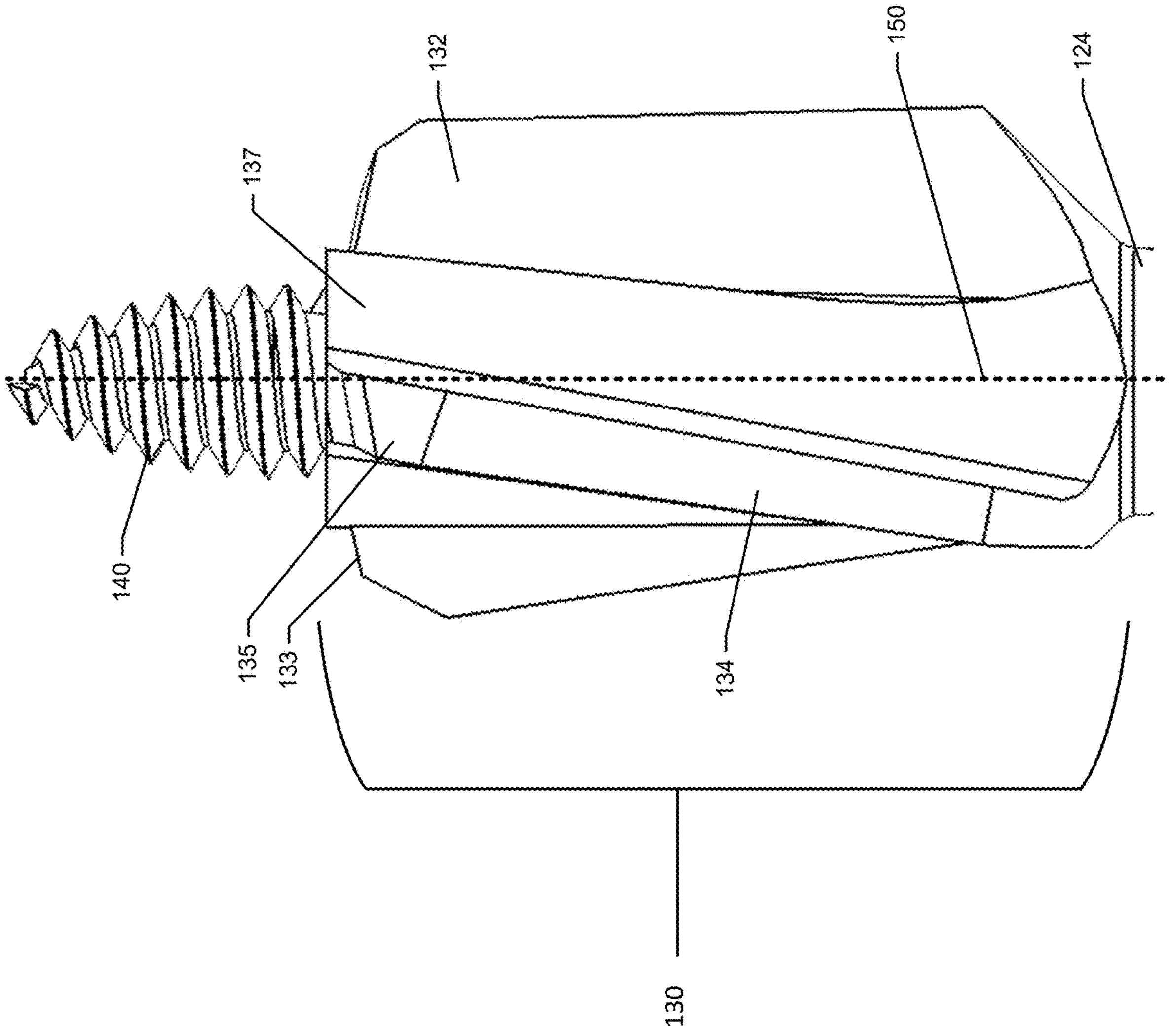
FIG. 2 illustrates a close-up side view of a portion of a boring tool in accordance with an example embodiment.

FIG. 2 illustrates a close-up side view of the cutting portion 130 and feed screw 140 of the boring tool 100 in accordance with an example embodiment. As mentioned above, the cutting portion 130 may include a plurality of paddles. In some embodiments, the cutting portion 130 may comprise three paddles arranged in a helical fold dual pattern. Each of the paddles may comprise a paddle body 132, a leading edge 133, a lateral edge 134, and a chamfer 135. In an example embodiment, the paddle body 132 of each of the paddles are disposed in an equiangular manner around a perimeter of the cutting portion 130 of the boring tool 100. In some cases, the paddle body 132 may be angled with respect to the longitudinal axis 150. In an example embodiment, the paddle body 132 may form an angle greater than or equal to 5 degrees and less than or equal to 15 degrees with respect to being parallel with the longitudinal axis 150. In this regard, the orientation of the paddle body 132 may assist with the actual boring operation itself as well as the efficient removal of cut material out of the bore. The leading edge 133 may extend substantially perpendicularly to the longitudinal axis 150. In this regard, substantially perpendicularly may indicate that the leading edge 133 forms an angle greater than or equal to 85 degrees and less than or equal to 90 degrees with the longitudinal axis 150. The leading edge 133 may form the primary cutting surface of the paddle body 132. In other words, the leading edge 133 may be the first component of the paddle body 132 to remove material from the working medium when the boring tool 100 is in use. The lateral edge 134 may extend substantially perpendicular to the leading edge 133. Again, substantially perpendicular may indicate that the lateral edge 134 forms an angle greater than or equal to 85 degrees and less than or equal to 90 degrees with the leading edge 133. In some embodiments, and due to the angle of the paddle body 132, an overall diameter for the cutting portion 130 may be greater proximate to the feed screw 140 and slightly smaller proximate to the second portion 124 of the shank 120. In this regard, the boring tool 100 may be better suited to avoid binding while in use. The lateral edge 134 may also be responsible for removing material from the working medium while the boring tool 100 is in use. In some embodiments, the lateral edge 134 may extend over 75% of the length of the cutting portion 130.

In an example embodiment, the leading edge 133 and the lateral edge 134 may comprise a lip relief. In other words, they may be beveled at 15 degrees instead of having a 90 degree edge such as on a regular rectangular prism. However, a range of values may be used for the lip relief in various embodiments. For example, the lip relief may be greater than or equal to 10 degrees and less than or equal to 20 degrees. Thus, one side of the leading edge 133 and one side of the lateral edge 134 may extend beyond the other side of each edge. In some embodiments, the higher side of each of the leading edge 133 and the lateral edge 134 may be the side that leads the paddle in the cutting motion due to the direction of rotation of the boring tool 100 when it is in use. A chamfer 135 may be provided where the leading edge 133 meets the lateral edge 134. The chamfer 135 may be a surface of the paddle body 132 that extends from the leading edge 133 to the lateral edge 134. In some embodiments, the angle of the chamfer 135 may be 45 degrees relative to each of the leading edge 133 and the lateral edge 134. However, a range of values may be used for the chamfer 135 in various example embodiments. For example, the chamfer 135 may be greater than or equal to 30 degrees and less than or equal to 60 degrees. As a result of the chamfer 135 residing between the leading edge 133 and the lateral edge 134, the chamfer 135 may be disposed at the same angle as the leading edge 133 and the lateral edge 134 because both of the leading edge 133 and the lateral edge 134 may already be beveled in their own regards. This gives the chamfer 135 the added benefit of reducing stress on the boring tool 100 as a whole. In other words, the chamfer 135 eliminates the presence of a 90 degree corner intersection of the leading edge 133 and the lateral edge 134. In doing so, the chamfer 135 reduces the amount of friction that the working medium can exert on the paddles and thus reduces the amount of torsional stress applied to the boring tool 100 while it is in use.

Also visible in FIG. 2 is a rib 137. There may be a rib 137 disposed equiangular between consecutive paddles around the perimeter of the cutting portion 130. In some embodiments, the rib 137 may be the component of the cutting portion 130 that extends the furthest forward toward the feed screw 140. In this regard, the rib 137 may come into contact with potential obstructions (e.g. nails, wires or screws) in the working medium before the leading edge 133 of the paddles. Therefore the ribs 137 may serve the primary purpose of pushing any obstructions in the working medium out of the way of the paddles and the rest of the cutting portion 130 so that any obstructions may be less likely to interfere with, or limit the operation of, the boring tool 100. Moving from the foremost projection of the rib 137 proximate to the feed screw 140 down towards the second portion 124 of the shank 120, the rib 137 may be machined to gradually grow less pronounced and recede into the paddle body 132. In other words, the rib 137 may not be perceptible beyond a distance of two-thirds to three-quarters of the length of the paddle body 132. The recession of the rib 137 may allow for the boring tool 100 to retain the functionality of guiding cut material and chips from the bore via the combination of the rotational motion of the boring tool 100 and the angle of the paddle body 132 which may push the cut material from the working medium out of the bore in the opposite direction of the boring operation. The specific geometry of the rib 137 and the paddle body 132 may allow for the boring tool 100 to operate at greater speed and efficiency to reduce the time and effort it takes to create a bore in a working medium.

Figure 3:
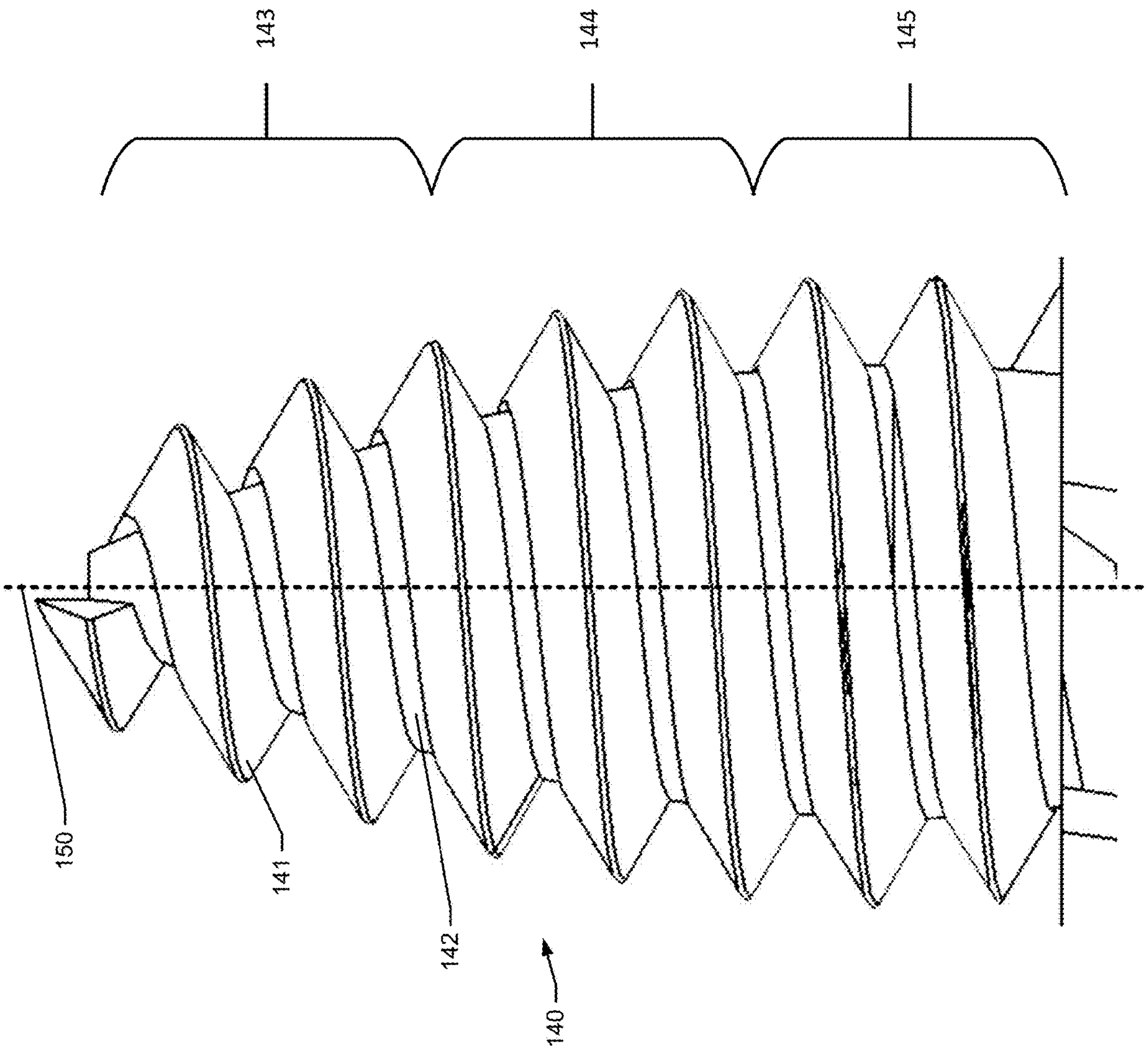
FIG. 3 illustrates a close-up side view of a feed screw of a boring tool in accordance with an example embodiment.

FIG. 3 illustrates a close-up side view of a portion of the boring tool 100 in accordance with an example embodiment. In particular, FIG. 3 provides a close up view of the feed screw 140. The feed screw 140 may both start and widen a bore in the working medium to increase the ease with which the boring tool 100 enters the working medium. The feed screw 140 may also help secure the boring tool 100 in a straight line when in use so that the resultant bore may be a clean cut. In some embodiments the feed screw 140 may comprise threads 141 wrapped around the exterior of a core 142. The threads 141 may help pull the boring tool 100 further into the working medium responsive to the rotational motion of the boring tool 100. In some cases, the core 142 of the feed screw 140 may be one half of a prolate spheroid in shape. In this regard, the diameter of the feed screw 140 may be smallest at the tip portion 143 of the feed screw 140. The diameter of the feed screw 140 may therefore increase as distance from the cutting portion 130 decreases. In some embodiments, the diameter of the feed screw 140 may increase through the tip portion 143 and the intermediate portion 144. Together, the tip portion 143 and the intermediate portion 144 may comprise roughly two thirds of the length of the feed screw 140. The base portion 145 may be disposed between the intermediate portion 144 and the cutting portion 130. The diameter of the feed screw 140 in the base portion 145 may remain relatively constant. In this regard, the tip portion 143 and the intermediate portion 144 may both help to start and widen the beginning of the bore, while the base portion 145 may merely pull the boring tool 100 into place with less emphasis on widening the beginning of the bore. This may help the boring tool 100 to be more secure in the working medium overall.

Figure 4:
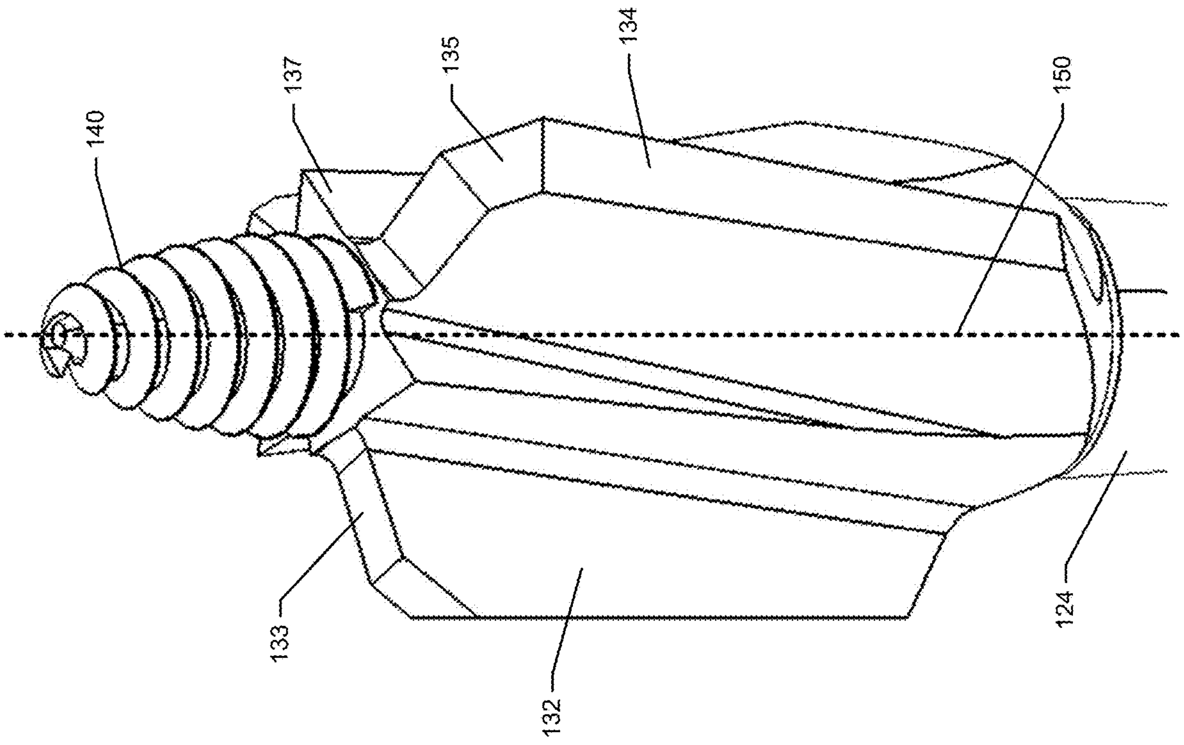
FIG. 4 illustrates a close-up perspective view of a portion of a boring tool in accordance with an example embodiment.
Figure 5:
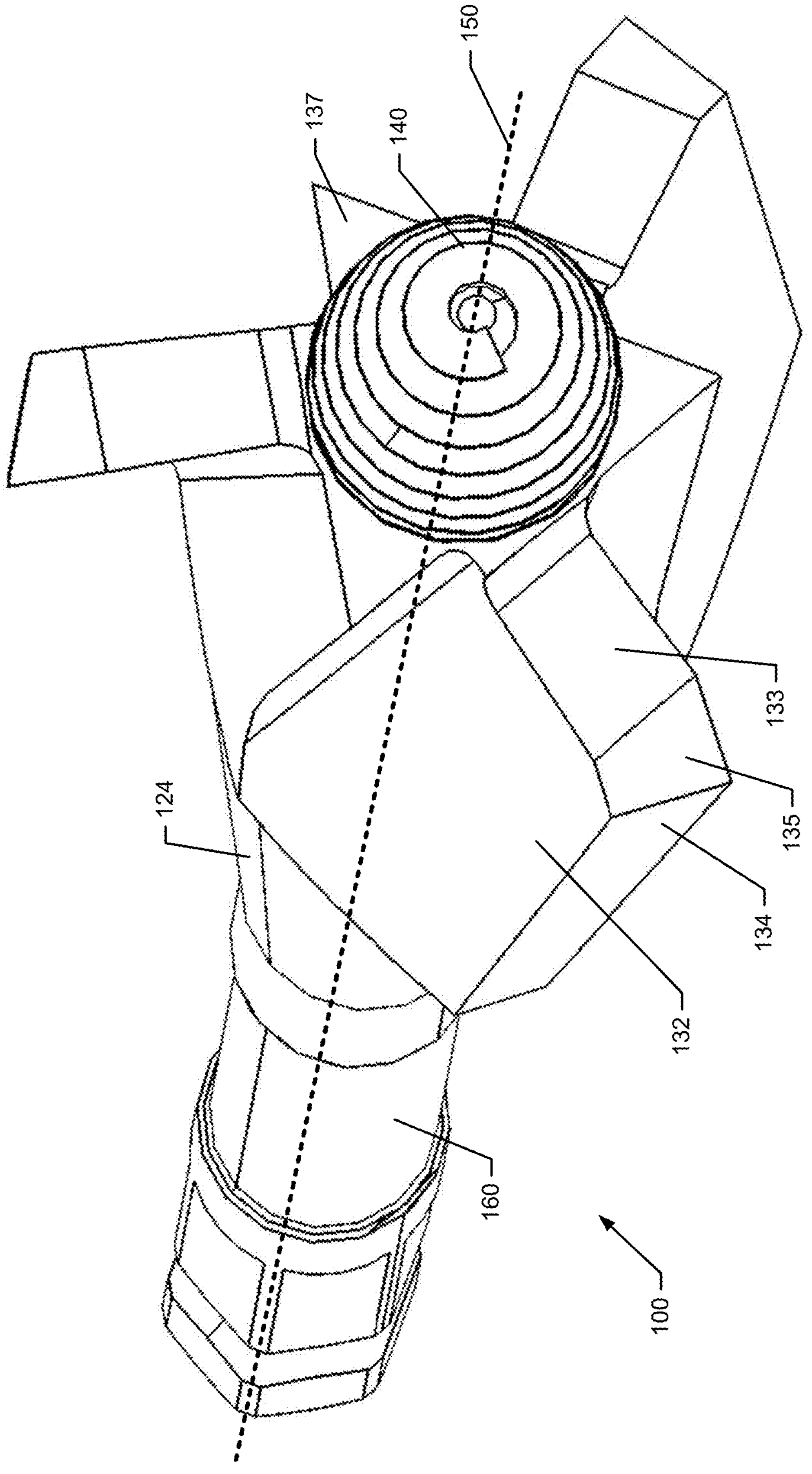
FIG. 5 illustrates a perspective view of a boring tool in accordance with an example embodiment.
Figure 6:
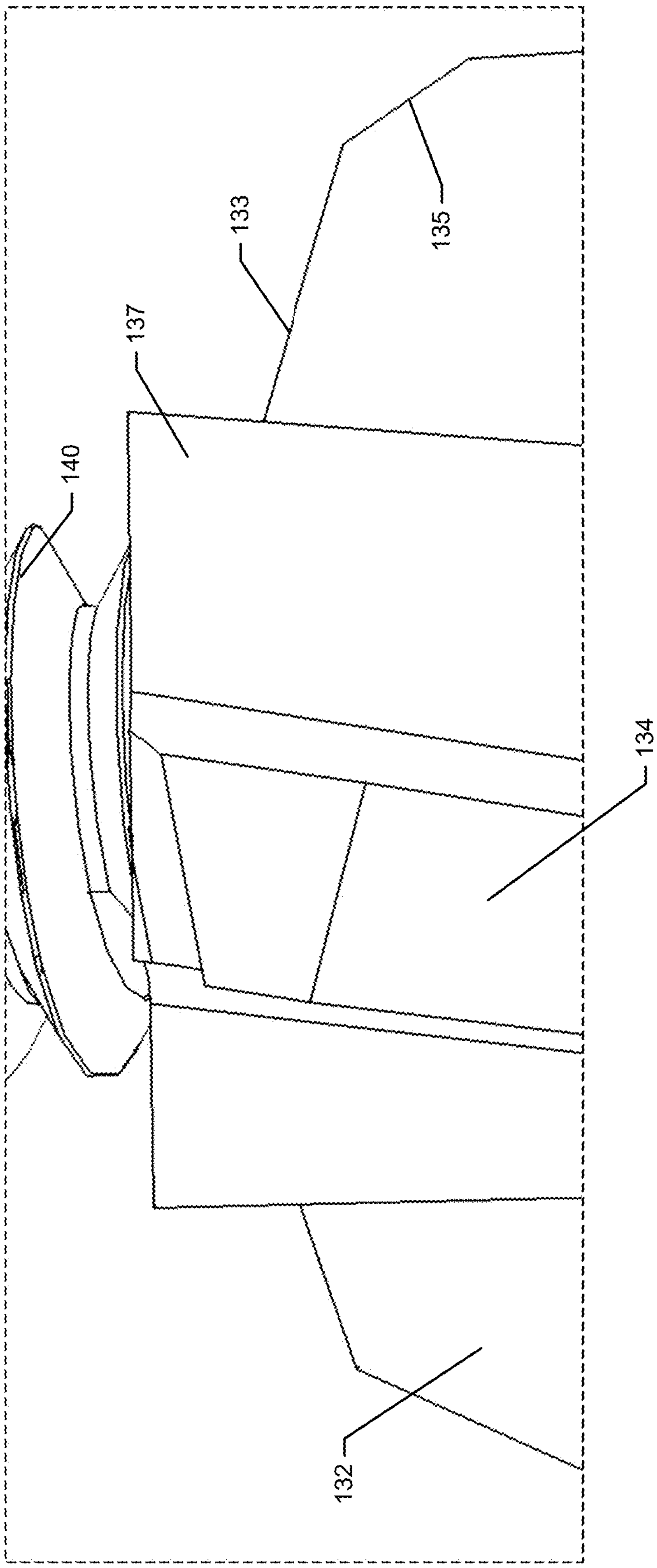
FIG. 6 illustrates a close-up side view of a portion of a boring tool in accordance with an example embodiment.
Figure 7:
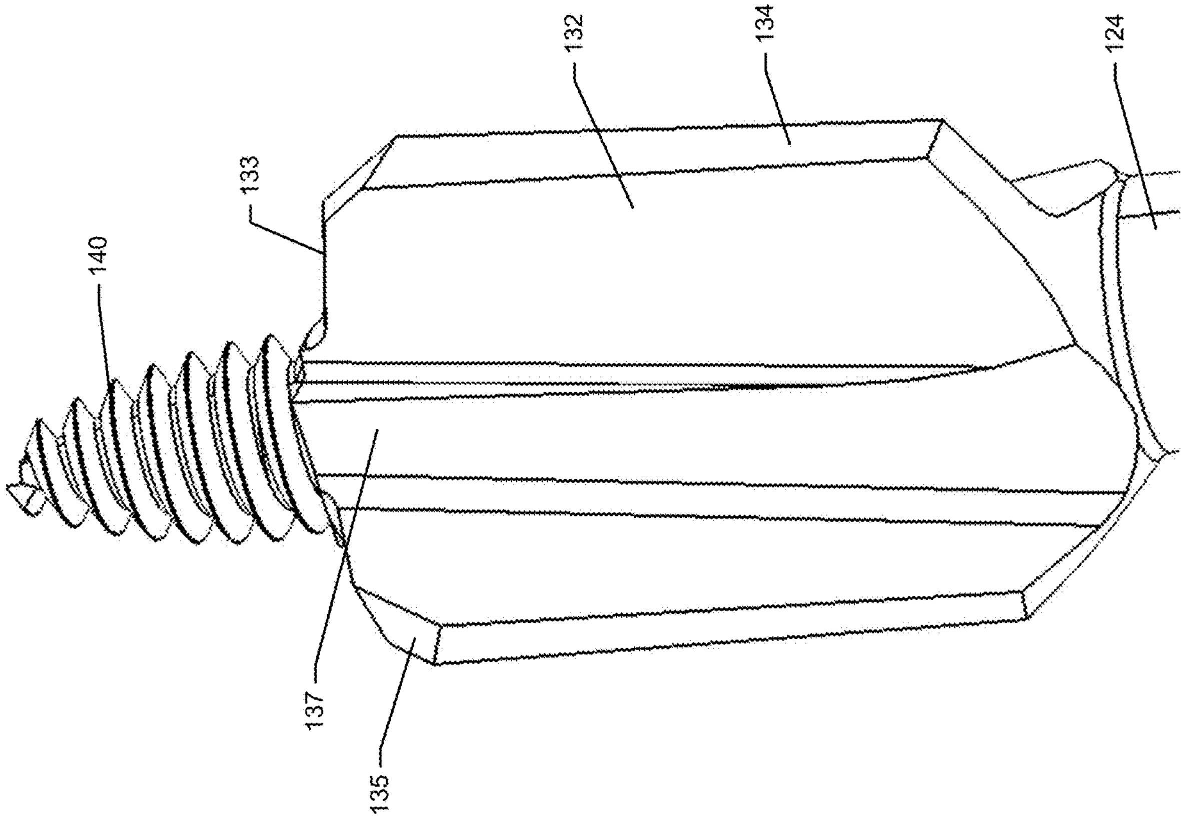
FIG. 7 illustrates a close-up perspective view of a portion of a boring tool in accordance with an example embodiment.

FIGS. 4-7 illustrate a mix of various close-up perspective and side views of the boring tool 100 in accordance with various example embodiments. In these views, the prominence of the plurality of structural features of the boring tool 100 may be more clearly on display. For example, in FIGS. 4 and 6, the rib 137 may be more clearly visibly forward of the leading edge 133 of the paddles. Further, the rib 137 recession into the paddle body 132 may be much more apparent in FIGS. 4 and 7 as the distance from the feed screw 140 increases. In some cases, the rib 137 may be said to blend into the paddle body 132 as the distance from the feed screw 140 increases. In FIGS. 4 and 5, the angle of the paddle body 132 with respect to the longitudinal axis 150 may also be more clearly identifiable, as well as the angle of the lip relief on the leading edge 133, lateral edge 134, and chamfer 135.

Some example embodiments may provide for a boring tool. The boring tool may include a coupling portion which may be at an end of the boring tool, a shank which may be operably coupled to the coupling portion, a cutting portion which may be operably coupled to the shank and a feed screw which may be operably coupled to the cutting portion at an opposite end of the boring tool from the coupling portion. The cutting portion may further include a first paddle, a second paddle, and a third paddle. The first paddle, the second paddle, and the third paddle may be disposed equiangular around a perimeter of the cutting portion. The first paddle, the second paddle, and the third paddle may each comprise a paddle body defined by a leading edge and a lateral edge. The leading edge may extend away from a longitudinal axis of the boring tool in a direction substantially perpendicular to the longitudinal axis of the boring tool. The lateral edge may extend away from the leading edge in a direction substantially perpendicular to the leading edge of the paddle body.

The boring tool of some embodiments may include additional features, modifications, augmentations and/or the like to achieve further objectives or enhance performance of the blade. The additional features, modifications, augmentations and/or the like may be added in any combination with each other. Below is a list of various additional features, modifications, and augmentations that can each be added individually or in any combination with each other. For example, the intersection of the leading edge and the lateral edge may comprise a chamfer. In an example embodiment, the chamfer may be a beveled edge at an angle that may be greater than or equal to 30 degrees and may be less than or equal to 60 degrees. In some cases, each of the leading edge and the lateral edge may a lip relief cut at an angle that may be greater than or equal to 10 degrees and may be less than or equal to 20 degrees. In an example embodiment, the paddle body of each of the first paddle, the second paddle, and the third paddle may extend from the feed screw toward the shank at an angle that may be greater than or equal to 5 degrees and may be less than or equal to 15 degrees. In some cases, the paddle body of each of the first paddle, the second paddle, and the third paddle may maintain a constant thickness. In an example embodiment, the shank may include a first portion operably coupled to the coupling portion, a second portion operably coupled to the cutting portion, and a torsion release neck that may be disposed in the first portion. In some cases, the second portion may taper from a larger diameter proximate to the cutting portion to a smaller diameter proximate to the first portion. In an example embodiment, the second portion may have a constant diameter from proximate to the cutting portion to proximate to the first portion. In some cases, the diameter of the torsion release neck may be 60%-95% of a diameter of the first end of the shank. In an example embodiment, the diameter of the torsion release neck may be 80%-90% of a diameter of the first end of the shank. In some cases, the feed screw may include a tip portion which may be disposed at a tip of the feed screw, an intermediate portion which may be operably coupled to the tip portion, and a base portion which may be operably coupled to the intermediate portion and may be operably coupled to the cutting portion of the boring tool. In an example embodiment, the feed screw may be shaped like a partial prolate spheroid. In some cases, the tip portion, the intermediate portion, and the base portion may each cover roughly one third of a total length of the feed screw measured from the cutting portion to the tip of the feed screw. In an example embodiment, the diameter of the feed screw in the base portion may not change. In some cases, the cutting portion may further include a rib which may be disposed between each of the first paddle, the second paddle, and the third paddle. In an example embodiment, the rib may extend closer to the feed screw than the leading edge. In some cases, the rib may recede into the paddle body between two thirds and three quarters of a length of the paddle body measured from the leading edge.

Some example embodiments may provide for a boring tool. The boring tool may include a coupling portion which may be at an end of the boring tool, a shank which may be operably coupled to the coupling portion, a cutting portion which may be operably coupled to the shank and a feed screw which may be operably coupled to the cutting portion at an opposite end of the boring tool from the coupling portion. The cutting portion may further include multiple paddles and multiple ribs disposed around a perimeter of the cutting portion. The multiple paddles may each comprise a paddle body, defined by a leading edge and a lateral edge. The leading edge may extend away from a longitudinal axis of the boring tool in a direction substantially perpendicular to the longitudinal axis of the boring tool. The lateral edge may extend away from the leading edge in a direction substantially perpendicular to the leading edge of the paddle body. The multiple ribs may each extend closer to the feed screw than the leading edge.

The boring tool of some embodiments may include additional features, modifications, augmentations and/or the like to achieve further objectives or enhance performance of the blade. The additional features, modifications, augmentations and/or the like may be added in any combination with each other. Below is a list of various additional features, modifications, and augmentations that can each be added individually or in any combination with each other. For example, the intersection of the leading edge and the lateral edge may comprise a chamfer. In an example embodiment, the chamfer may be a beveled edge at an angle that may be greater than or equal to 30 degrees and may be less than or equal to 60 degrees. In some cases, each of the leading edge and the lateral edge may comprise a lip relief cut at an angle that may be greater than or equal to 10 degrees and may be less than or equal to 20 degrees. In an example embodiment, each paddle body may be angled with respect to the longitudinal axis of the boring tool. In some cases, each paddle body may maintain a constant thickness.

Some example embodiments may provide for a boring tool. The boring tool may include a coupling portion which may be at an end of the boring tool, a shank which may be operably coupled to the coupling portion, a cutting portion which may be operably coupled to the shank and a feed screw which may be operably coupled to the cutting portion at an opposite end of the boring tool from the coupling portion. The feed screw may be shaped like a partial prolate spheroid and may be disposed at a distal end of the cutting portion. The feed screw may comprise a base portion which may be operably coupled to the cutting portion, an intermediate portion which may be operably coupled to the base portion, and a tip portion which may be operably coupled to the intermediate portion. The diameter of the feed screw in the tip portion and the intermediate portion may get larger moving toward the base portion. The diameter of the feed screw in the base portion may not get larger moving toward the cutting portion.

The boring tool of some embodiments may include additional features, modifications, augmentations and/or the like to achieve further objectives or enhance performance of the blade. The additional features, modifications, augmentations and/or the like may be added in any combination with each other. Below is a list of various additional features, modifications, and augmentations that can each be added individually or in any combination with each other. For example, the cutting portion may include multiple paddles and multiple ribs disposed around a perimeter of the cutting portion. In some cases, the multiple paddles may each comprise a paddle body which may be defined by a leading edge and a lateral edge. In an example embodiment, the leading edge may extend away from a longitudinal axis of the boring tool in a direction substantially perpendicular to the longitudinal axis of the boring tool. In some cases, the lateral edge may extend away from the leading edge in a direction substantially perpendicular to the leading edge of the paddle body. In an example embodiment, the multiple ribs may each extend closer to the feed screw than the leading edge. In some cases, the intersection of the leading edge and the lateral edge may comprise a chamfer. In an example embodiment, the chamfer may be a beveled edge at an angle that may be greater than or equal to 30 degrees and may be less than or equal to 60 degrees.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A boring tool comprising:

a coupling portion at an end of the boring tool;

a shank operably coupled to the coupling portion;

a cutting portion operably coupled to the shank; and a feed screw operably coupled to the cutting portion at an opposite end of the boring tool from the coupling portion, wherein the cutting portion further comprises:

a first paddle, a second paddle, and a third paddle, wherein the first paddle, the second paddle, and the third paddle are disposed equiangular around a perimeter of the cutting portion, wherein the first paddle, the second paddle, and the third paddle each comprise a paddle body defined by a leading edge and a lateral edge, wherein the leading edge extends away from a longitudinal axis of the boring tool in a direction substantially perpendicular to the longitudinal axis of the boring tool, wherein the lateral edge extends away from the leading edge in a direction substantially perpendicular to the leading edge of the paddle body, wherein the intersection of the leading edge and the lateral edge comprises a chamfer, and wherein the chamfer is a beveled edge at an angle greater than or equal to 30 degrees and less than or equal to 60 degrees.

2. The boring tool of claim 1, wherein each of the leading edge and the lateral edge comprise a lip relief cut at an angle of greater than or equal to 10 degrees and less than or equal to 20 degrees.

3. The boring tool of claim 1, wherein the paddle body of each of the first paddle, the second paddle, and the third paddle extends from the feed screw toward the shank at an angle of greater than or equal to 5 degrees and less than or equal to 15 degrees.

4. The boring tool of claim 1, wherein the paddle body of each of the first paddle, the second paddle, and the third paddle maintains a constant thickness.

5. The boring tool of claim 1, wherein the shank comprises:

a first portion operably coupled to the coupling portion, a second portion operably coupled to the cutting portion, and a torsion release neck disposed in the first portion.

6. The boring tool of claim 5, wherein the second portion tapers from a larger diameter proximate to the cutting portion to a smaller diameter proximate to the first portion.

7. The boring tool of claim 5, wherein the second portion has a constant diameter from proximate to the cutting portion to proximate to the first portion.

8. The boring tool of claim 5, wherein a diameter of the torsion release neck is greater than 60% of a diameter of the first end of the shank, and less than 95% of the diameter of the first end of the shank.

9. The boring tool of claim 8, wherein a diameter of the torsion release neck is greater than 80% of a diameter of the first end of the shank, and less than 90% of the diameter of the first end of the shank.

10. The boring tool of claim 1, wherein the feed screw comprises a tip portion disposed at a tip of the feed screw, an intermediate portion operably coupled to the tip portion, and a base portion operably coupled to the intermediate portion and to the cutting portion of the boring tool, and wherein the feed screw is shaped like a partial prolate spheroid.

11. The boring tool of claim 10, wherein the tip portion, the intermediate portion, and the base portion each cover roughly one third of a total length of the feed screw measured from the cutting portion to the tip of the feed screw, and wherein the diameter of the feed screw in the base portion does not change.

12. The boring tool of claim 1, wherein the cutting portion further comprises a rib disposed between each of the first paddle, the second paddle and the third paddle, wherein the rib extends closer to the feed screw than the leading edge, and wherein the rib recedes into the paddle body between two thirds and three quarters of a length of the paddle body measured from the leading edge.

13. A boring tool comprising:

a coupling portion at an end of the boring tool;

a shank operably coupled to the coupling portion;

a cutting portion operably coupled to the shank; and a feed screw operably coupled to the cutting portion at an opposite end of the boring tool from the coupling portion, wherein the cutting portion further comprises multiple paddles and multiple ribs disposed around a perimeter of the cutting portion, wherein the multiple paddles each comprise a paddle body defined by a leading edge and a lateral edge, wherein the leading edge extends away from a longitudinal axis of the boring tool in a direction substantially perpendicular to the longitudinal axis of the boring tool, wherein the lateral edge extends away from the leading edge in a direction substantially perpendicular to the leading edge of the paddle body, and wherein the multiple ribs each extend closer to the feed screw than the leading edge.

14. The boring tool of claim 13, wherein the intersection of the leading edge and the lateral edge comprises a chamfer, and wherein the chamfer is a beveled edge at an angle greater than or equal to 30 degrees and less than or equal to 60 degrees.

15. The boring tool of claim 13, wherein each of the leading edge and the lateral edge comprise a lip relief cut at an angle of greater than or equal to 10 degrees and less than or equal to 20 degrees.

16. The boring tool of claim 13, wherein each paddle body is angled with respect to the longitudinal axis of the boring tool, and wherein each paddle body maintains a constant thickness.

17. A boring tool comprising:

a coupling portion at an end of the boring tool;

a shank operably coupled to the coupling portion;

a cutting portion operably coupled to the shank; and a feed screw operably coupled to the cutting portion at an opposite end of the boring tool from the coupling portion, wherein the feed screw is shaped like a partial prolate spheroid and disposed at a distal end of the cutting portion, wherein the feed screw comprises a base portion operably coupled to the cutting portion, an intermediate portion operably coupled to the base portion, and a tip portion operably coupled to the intermediate portion, wherein the diameter of the feed screw in the tip portion and the intermediate portion gets larger moving toward the base portion, wherein the diameter of the feed screw in the base portion does not get larger moving toward the cutting portion, wherein the intersection of the leading edge and the lateral edge comprises a chamfer, and wherein the chamfer is a beveled edge at an angle greater than or equal to 30 degrees and less than or equal to 60 degrees.

18. The boring tool of claim 17, wherein the cutting portion further comprises multiple paddles and multiple ribs disposed around a perimeter of the cutting portion, wherein the multiple paddles each comprise a paddle body defined by a leading edge and a lateral edge, wherein the leading edge extends away from a longitudinal axis of the boring tool in a direction substantially perpendicular to the longitudinal axis of the boring tool, wherein the lateral edge extends away from the leading edge in a direction substantially perpendicular to the leading edge of the paddle body, and wherein the multiple ribs each extend closer to the feed screw than the leading edge.

* * * * *